United States Patent [19]

Hong et al.

[11] Patent Number: 5,556,719

[45] Date of Patent: *Sep. 17, 1996

[54] METHOD FOR MAKING HIGH CAPACITY HYDROGEN STORAGE ELECTRODE AND HYDRIDE BATTERIES USING SAME

[76] Inventors: Kuochih Hong, 1790 Rollingwoods, Troy, Mich. 48098; Kuoshiu Hong, 10F, No. 8, Li-Nung Street, Sec 1, Taipei, Taiwan; Huiyim Hong, 4F, No. 9, 32 Nung, Alley 189, Cheng-Tai Road, Sec 1, Wu-ku Hsiang, Taipei, Hsien, Taiwan

[ * ] Notice: The term of this patent shall not extend beyond the expiration date of Pat. No. 5,501,917.

[21] Appl. No.: 266,187

[22] Filed: Jun. 27, 1994

Related U.S. Application Data

[63] Continuation-in-part of Ser. No. 189,080, Jan. 28, 1994, Pat. No. 5,501,917.

[51] Int. Cl.⁶ ........................ H01M 4/24
[52] U.S. Cl. .................. 429/218; 429/59; 429/101; 429/223; 420/455; 420/900; 29/623.1; 264/60; 419/2; 419/30; 419/48; 423/644
[58] Field of Search ........................ 420/455, 900; 429/59, 101, 218, 223, 219, 224, 233; 29/623.1; 419/2, 3, 14, 66, 30, 26, 43, 48, 53; 264/60, 61; 423/644

[56] References Cited

U.S. PATENT DOCUMENTS

| | | |
|---|---|---|
| 4,670,214 | 6/1987 | Magnuson et al. |
| 4,820,481 | 4/1989 | Wolff et al. |
| 4,849,205 | 7/1989 | Hong. |
| 4,915,898 | 4/1990 | Wolff et al. |
| 5,006,328 | 4/1991 | Hong ........................ 423/644 |
| 5,096,667 | 3/1992 | Fetcenko ........................ 420/580 |
| 5,242,656 | 9/1993 | Zhang et al. ........................ 420/417 |
| 5,354,576 | 10/1994 | Zhang et al. ........................ 429/59 |
| 5,358,800 | 10/1994 | Zhang et al. ........................ 429/59 |

*Primary Examiner*—M. Nuzzolillo

[57] ABSTRACT

This invention discloses a method to make an improved hydrogen/hydride electrode for electro-chemical applications. The method comprises the steps of: (1) preparing the slurry of hydrogen storage material; (2) pasting the slurry onto and/or into a substrate current collector to make a wet pasted electrode; (3) drying the wet pasted electrode; and (4) sintering the pasted electrode. The aforementioned method is very useful for the hydrogen storage alloy comprising of Ti, 2–70 at. %; Zr, 2–70 at. % and Ni, 5–80 at. %. It is also useful for a pseudo $AB_5$- or $AB_2$-type alloy. In particular, a high capacity hydrogen storage electrode comprising a multicomponent hydrogen storage alloy having composition represented by the formula: $Ti_aZr_bNi_cNb_yR_zM_x$, is made, wherein R is at least one element selected from the group consisting of C, Mg, Al, B, Si, V, Cr, Mn, Fe, Co, Cu, Zn, Hf, Bi, Sn, Ta, W, Pd, Ag, Mo, Sb, La, Ce, and Mm; M is at least one element selected from the group consisting of Ca, Li, Na, K, Rb, Cs, S and P; and the atomic mole ratios, a, b, c, x, y, and z are defined by: $0.22 \leq a \leq 0.70$, $0.02 \leq b \leq 0.70$, $0.05 \leq c \leq 0.80$, $0.02 \leq y \leq 0.50$, $0.005 \leq z \leq 0.30$, $0 \leq x \leq 0.30$, and $a+b+c+x+y+z=1.00$.

7 Claims, No Drawings

METHOD FOR MAKING HIGH CAPACITY HYDROGEN STORAGE ELECTRODE AND HYDRIDE BATTERIES USING SAME

CROSS-REFERENCE TO RELATED APPLICATIONS

This application is a continuation in part application of application Ser. No. 08/189,080, filed on Jan. 28, 1994, now U.S. Pat. No. 5,501,917.

BACKGROUND OF THE INVENTION

1. Field of the Invention

This invention relates to rechargeable hydride batteries. More particularly, the invention discloses a method to make an improved high capacity rechargeable hydride electrode and the metal oxide-hydride batteries thereof.

2. The Related Art

Magnuson et al. in U.S. Pat. No. 4,670,214, Wolff et al in U.S. Pat. Nos. 4,820,481 and 4,915,898 reported methods to prepare hydrogen storage negative electrode. The methods in these patents all use dry powder, a complicated weighing, loading and vibrating device, and a troublesome, consecutive two-pair rollers pressing system. As a result, there are many problems encountered in the fabrication of a hydrogen storage electrode. First, it is very difficult to control the uniform thickness. Second, the process is slow. Third, it creates non-uniform stress across the electrode. Consequently, the quality of the electrode made is poor, and the production rate is low.

To solve these problems, the present invention provides a new method for making high capacity hydrogen storage electrodes for electrochemical applications.

SUMMARY OF THE INVENTION

The present invention discloses an improved method for making high capacity hydrogen storage/hydride electrodes for electrochemical applications, and in particular for rechargeable hydride battery applications.

The method comprises the steps of: (1) preparing the slurry of a hydrogen storage material; (2) pasting the slurry onto and/or into the substrate to form a pasted electrode; (3) drying and pressing the pasted electrode, (4) sintering the pasted electrode, (5) re-pressing the electrode and (6) re-sintering the electrode.

The aforementioned method can be used for various hydrogen storage materials such as $AB_5$-type, $AB_2$-type and their modification including their pseudo-type alloys. This method is particularly useful for the Ti—Zr—Ni—Cr—M, Ti—Zr—Cr—V—Ni—M, Ti—Zr—V—Ni—M and Ti—V—Ni—Mn—M alloys disclosed by Hong in U.S. Pat. Nos. 4,849,205 and 5,006,328, as well as an alloy: $A_aB_bNi_cD_yM_xR_z$ disclosed in a U.S. patent application Ser. No. 08/189,080 filed on Jan. 28, 1994.

In another aspect, this invention is directed to provide a rechargeable electrochemical cell (battery) using the hydrogen storage electrode made by the improved method given in the present invention.

The advantages, features, and other objects of the present invention will become obvious from the following detailed description.

DETAILED DESCRIPTION OF THE INVENTION

The present invention discloses an improved method for making a high capacity hydrogen storage/hydride electrode for electrochemical application, and in particular for rechargeable hydride battery application. The method comprises the following steps: (1) preparing slurry of the hydrogen storage material; (2) pasting the slurry onto and/or into substrate to form a pasted electrode, (3) drying and pressing the pasted electrode, (4) sintering the pasted electrode, (5) re-pressing the electrode and (6) re-sintering the electrode.

In the present invention, the slurry is prepared by homogeneously mixing: (by weight), (1) 100 parts of hydrogen storage alloy powder having sizes 100 mesh or smaller, (2) 0.5 to 8 parts, preferably 1.2 to 4.0 parts, of binder, which is one or more organic material selected from the group of MC (methyl cellulose), polyox, PVA (polyvinyl alcohol), PTFE, CMC, (3) 2 to 15 parts, preferably 3 to 7 parts, of conductive powder which is one or more selected from the group consisting of nickel, zinc, copper, aluminum and carbon; and (4) 30 to 60 parts, preferably 40 to 55 parts pure water.

The hydrogen storage material can be the multicomponent alloy comprising of Ti, 2 to 70 at. %; Zr, 2 to 70 at. % and Ni, 5 to 80 at. %. In particular, the hydrogen storage material has the composition represented by: $A_aB_bNi_cD_yM_xR_z$ and its hydride thereof; where A is at least one element selected from the group consisting of Ti, Zr, Hf and Mg; B is at least one element selected from the group consisting of Al, Si, V, Mn, Pd, Nb and Ag; D is at least one element selected from the group consisting of Cr, Fe, Co, Cu, Zn, Nb, Mo, W and Sn; R is at least one element selected from the group consisting of C, B, Ca, Sb, Bi, Sc, Y, Hf, Ta, O, N, Ge, Ga and Mm, where Mm is mischmetal; M is at least one element selected from the group consisting of Li, Na, K, Rb, Cs, P and S; and where the atomic mole ratios, a, b, c, x, y and z are defined by: $0.10 \leq a \leq 0.85$, $0.01 \leq b \leq 0.65$, $0.02 \leq c \leq 0.75$, $0 \leq x \leq 0.30$, $0 \leq y \leq 0.30$, $0 \leq z \leq 0.30$ and $a+b+c+x+y+z=1.00$.

The slurry is then pasted onto and/or into a current collector substrate by a pasted method using printing, brush or doctor blade. The substrate is selected from thin nickel or nickel-plated steel mesh, sponge/fiber, or perforated or expanded sheet, preferable thin nickel-plated perforated sheet or sponge/fiber. The wet pasted electrode made is dried at temperature between 80 to 280 degree centigrades.

The dry pasted electrode is then pressed and sintered at 850 to 1100 degree centigrade for 10 to 60 minutes, preferably 15 to 30 minutes, under vacuum or a protective atmosphere selected from inert gas, hydrogen, hydrocarbon gas or a gas mixture thereof. The strong strength sintered electrode formed is re-pressed through a pair of rollers further reducing the thickness and increasing the strength. Finally the electrode is re-sintered again to relief the stress. Thus a uniform high capacity hydrogen storage/hydride electrode is obtained and has an electrochemical capacity of from 1.05 to 2.40 AH/cc, depending on the hydrogen storage alloy used.

The aforementioned method is particularly useful for the alloys: Ti—Zr—Ni—Cr—M, Ti—Zr—Cr—Ni—V—M, Ti—Zr—V—Ni—M and Ti—M—V—Ni—M disclosed by Hong in U.S. Pat. No. 4,849,205. Other multicomponent alloys such as pseudo $AB_5$ and $AB_2$-type and their modifications can also be able to apply this method to obtain an improved electrode.

Before combining with a positive electrode, the hydrogen storage electrode, which is made by the aforementioned method in the present invention, can be, if necessary, treated with an alkaline solution or a weak acidic solution with a pH value between 3 and 7, preferably 5.5 to 6.5, at temperatures between 20 to 120 degrees Centigrade for 25 to 360 minutes, preferably at between 75 to 105 degrees Centigrade for 35 to 90 minutes. In this case, the electrode then is subjected to washing and drying processes. The electrode is thus ready to be used as a negative electrode.

A suitable size of the negative electrode is cut to combine with a matching size of the metal oxide positive electrode having an electrochemical capacity from 0.45 to 0.75 AH/cc. The positive electrode active material is comprised of at least one metal oxide, preferably a nickel oxide plus 1 to 15 wt. % cobalt oxide. To ensure high efficiency, 1 to 15 wt. % of fine conductive powder selected from the group consisting of nickel, copper, carbon, zinc, and aluminum and combinations thereof, is added during the preparation of slurry or paste of the positive electrode. The positive electrode can be a sintered type or a pasted type electrode. The separator is cut of a similar size and is placed between the negative and positive electrodes to electrically separate them. The separator is composed of a porous body of insulator film or thin sheet of organic or inorganic material selected from the group consisting of polyamide (such as nylon), polypropylene, polyethylene, polysulfone, PVC. The thickness of separator is from 0.1 mm to 2.00 mm, preferably from 0.20 mm to 0.50 mm. The positive and negative electrodes, and the separator are placed in a container. The container is made of either metal such as nickel, nickle-plated steel or plastic material such as PVC, polypropylene, polysulfone, ABS and polyamide. Finally, an electrolyte is added to complete an electrochemical cell (battery). The electrolyte is composed of alkaline solution, preferably KOH solution with concentration from 20 to 40 wt. % plus 0 to 10 wt. % of LiOH.

EXAMPLE 1

A multicomponent hydrogen storage electrode material has composition represented by the formula: $Ti_a Zr_b Ni_c Nb_y R_z M_x$, where R is one or more elements selected from the group consisting of C, Mg, Al, B, Si, V, Cr, Mn, Fe, Co, Cu, Zn, Hf, Bi, Sn, Ta, W, Pd, Ag, Mo, Sb, La, Ce, and Mm (mischmetal); M is at least one element selected from the group consisting of Ca, Li, Na, K, Rb, Cs, S and P; and the atomic mole ratio a, b, c, d, z are defined by: $0.02 \leq a \leq 0.70$, $0.02 \leq b \leq 0.70$, $0.05 \leq c \leq 0.80$, $0.02 \leq y \leq 0.50$, $0.005 \leq z \leq 0.30$, $0 \leq x \leq 0.30$ and $a+b+c+x+y+z=1.00$. It

TABLE 1

| | High Capacity Hydrogen Storage Electrode | | | | | | |
|---|---|---|---|---|---|---|---|
| | Alloy Composition | | | | | Electrode | |
| No. | Ti | Zr | Ni | Nb | R/M | Thickness (mm) | Capacity (AH/cc) |
| N01 | 0.25 | 0.28 | 0.40 | 0.05 | 0.02(Hf) | | 0.25 | 1.33 |
| N02 | 0.15 | 0.15 | 0.10 | 0.48 | 0.12(Cr) | | 0.30 | 1.50 |
| N03 | 0.20 | 0.16 | 0.48 | 0.12 | 0.02(Mn) | 0.02(Mo) | 0.42 | 1.28 |
| N04 | 0.25 | 0.17 | 0.38 | 0.08 | 0.05(Ta) | 0.07(Co) | 0.42 | 1.25 |
| N05 | 0.20 | 0.23 | 0.39 | 0.07 | 0.03(Na) | 0.08(Li) | 0.38 | 1.48 |
| N06 | 0.26 | 0.17 | 0.39 | 0.10 | 0.05(Cr) | 0.03(Mm) | 0.36 | 1.50 |
| N07 | 0.28 | 0.18 | 0.38 | 0.08 | 0.04(Cu) | 0.04(Zn) | 0.35 | 1.35 |
| N08 | 0.22 | 0.20 | 0.30 | 0.20 | 0.06(Al) | 0.02(Ag) | 0.36 | 1.30 |
| N09 | 0.12 | 0.17 | 0.27 | 0.35 | 0.03(Mn) | 0.06(Cr) | 0.30 | 1.55 |
| N10 | 0.16 | 0.18 | 0.25 | 0.30 | 0.05(Al) | 0.06(Hf) | 0.30 | 1.40 |
| N11 | 0.20 | 0.15 | 0.50 | 0.11 | 0.03(Mg) | 0.01(K) | 0.34 | 1.48 |
| N12 | 0.33 | 0.12 | 0.36 | 0.10 | 0.05(Cr) | 0.04(Ca) | 0.29 | 1.35 |
| N13 | 0.22 | 0.13 | 0.40 | 0.22 | 0.02(Si) | 0.01(Pd) | 0.34 | 1.48 |
| N14 | 0.32 | 0.15 | 0.15 | 0.14 | 0.20(Mn) | 0.04(Sn) | 0.36 | 1.45 |
| N15 | 0.50 | 0.02 | 0.32 | 0.03 | 0.11(Mn) | 0.02(Li) | 0.36 | 1.38 |
| N16 | 0.15 | 0.35 | 0.33 | 0.15 | 0.01(Fe) | 0.01(P) | 0.45 | 2.03 |
| N17 | 0.07 | 0.43 | 0.30 | 0.10 | 0.05(Mn) | 0.05(V) | 0.45 | 1.39 | was used to make a high capacity hydrogen storage/hydride electrode according to the aforementioned method of the present invention. Table 1 shows some of the results. The electrodes made have a width up to 300 mm and a length up to 100 mm with a thickness range from 0.23 mm up to 0.50 mm. These electrodes are very uniform and have strong mechanical structure. They have high capacity between 1.20 AH/cc and 1.8 AH/cc and have long cycle life. The electrodes made have been used to make high capacity nickel-hydride cells.

EXAMPLE 2

In according with the present invention, an improved high capacity sintered hydrogen storage/hydride electrode using alloy: $Ti_{0.25}Zr_{0.17}Hf_{0.01}V_{0.08}Cr_{0.06}Ni_{0.39}Mn_{0.04}$ was made. A suitable size of this negative electrode was cut. According to the present invention, a matching nickel positive electrode and nylon separator were provided to make a rechargeable C-size sealed nickel-hydride cell. The N/P ratio was 1.35. The electrolyte was 6 cc. of 30 wt. % KOH+5% LiOH aqueous solution. The cell was very easy to activate. The cell was charged to 1.50 V at 0.2 C-rate and discharged to 1.0 V. The capacity was up to 3.8 AH at a 3A current within three cycles. It was cycled to 425 times without significant degradation.

EXAMPLE 3

In according with the present invention, an improved high capacity sintered hydrogen storage/hydride electrode using the alloy: $Ti_{0.20}Zr_{0.22}Nb_{0.07}Ni_{0.37}Cr_{0.06}Mn_{0.07}Sn_{0.01}$ was prepared. A suitable size of this negative electrode was cut. According to the present invention, a matching sintered nickel positive electrode and nylon separator were provided to make a rechargeable C-size sealed nickel-hydride cell. The N/P ratio was 1.50. The electrolyte was 6.50 cc of 30 wt. % KOH+5% LiOH aqueous solution. The cell was easy to activate. The cell was charged to 1.50 V at 0.2 C-rate and discharged to 1.0 V. The capacity was up to 4.0 AH at 0.3 C-rate. It was cycled 428 times and no significant degradation was observed.

EXAMPLE 4

In according with the present invention, an improved high capacity sintered hydrogen storage/hydride electrode using alloy: $Ti_{.25}Zr_{0.18}Nb_{0.08}Mo_{0.03}Ni_{0.39}Cr_{0.03}Cu_{0.04}$ was prepared. A suitable size of this negative electrode was cut. According to the present invention, a matching pasted nickel positive electrode and nylon separator were provided to make a rechargeable AA-size sealed nickel-hydride cell. The N/P ratio was 1.30. The electrolyte was 2.0 cc of 32 wt. % KOH+10% LiOH aqueous solution. The cell was easy to activate. It was charged to 1.50 V at 0.2 C-rate and discharged to 1.0 V The capacity was up to 1220 mAH at 0.3 C-rate. It was cycled 357 times without significant degradation.

EXAMPLE 5

In according with the present invention, an improved high capacity sintered hydrogen storage/hydride electrode using alloy: $Ti_{0.16}Zr_{0.27}V_{0.11}Ni_{0.38}Al_{0.03}Cr_{0.03}Ta_{0.02}$ was prepared. A suitable size of this negative electrode was cut. According to the present invention, a matching pasted nickel positive electrode and nylon separator were provided to make a rechargeable AA-size sealed nickel-hydride cell. The N/P ratio was 1.45. The electrolyte was 1.8 cc of 30 wt. % KOH +5% LiOH aqueous solution. The cell was charged to 1.50 V at 0.2 C-rate and discharged to 1.0 V. The capacity was up to 1185 mAH at a 1.0 A current. After 450 cycles, less than a 10% capacity drop was observed.

To those skilled in the art to which this invention appertains, the above described preferred embodiments may be subjected to change or modification. Such change or modification can be carried out without departing from the

What is claimed is:

1. An electrochemical cell comprising of:

(1) A container, (2) A metal oxide positive electrode;

(3) A hydrogen storage/hydride electrode as a negative electrode, wherein said negative electrode comprises of a hydrogen storage material having composition represented by the formula:

$Ti_aZr_bNi_cNb_yR_zM_x$, and its hydride thereof, where R is at least one element selected from the group consisting of B, Zn, Hf, Bi, Sn, W, Mo, and Sb; M is at least one element selected from the group consisting of Li, Na, K, Rb, Cs, S and P; and the atomic ratios; a, b, c, x, y and z are defined by; $0.02 \leq a \leq 0.70$, $0.02 \leq b \leq 0.70$, $0.05 \leq c \leq 0.80$, $0.02 \leq y \leq 0.50$, $0.005 \leq z \leq 0.30$, $0 \leq x \leq 0.30$, and $a+b+c+x+y+z=1.00$.

(4) A separator, placed between said negative and positive electrodes, said separator and said positive and negative electrodes being placed in said container;

(5) An electrolyte; placed in said container in contact with said negative and positive electrode and with said separator.

2. The electrochemical cell of claim 1, wherein R is at least one element selected from the group consisting of Zn, Hf, Sn, W, and Sb.

3. An alloy for high capacity hydrogen storage electrode comprising of:

7 to 50 at. % Ti;

2 to 43 at. % Zr;

10 to 50 at. % Ni;

3 to 48 at. % Nb; and 1 to 8 at. % of a fifth element chosen from the group consisting of Hf, Li, Zn, K, Sn, P; plus 1 to 20 at. % of one or two elements chosen from the group consisting of Hf, Cr, Mn, Mg, Cu, Al, Na, and Fe.

4. The hydrogen storage material of claim 3, wherein said hydrogen storage material has composition represented by:

$Ti_{0.20}Zr_{0.22}Nb_{0.07}Ni_{0.37}Cr_{0.06}Mn_{0.07}Sn_{0.01}$.

5. A method for making a high capacity rechargeable hydrogen/hydride electrode comprising the steps of:

(1) preparing a slurry of hydrogen storage material; wherein said slurry of hydrogen storage material comprises a hydrogen storage material having composition formula:

$A_aB_bNi_cD_yM_xR_z$, and its hydride thereof; where A is at least one element selected from the group consisting of: Ti, Zr, Hf, and Mg; B is at least one element selected from the group consisting of: Al, Si, V, Mn, Pd, Nb, and Ag; D is at least one element selected from the group consisting of Cr, Fe, Co, Cu, Zn, Nb, Mo, W and Sn; R is at least one element selected from the group consisting of C, B, Ca, Sb, Bi, Sc, Y Hf, Ta, O, N, Gc, Ga and Mm, where Mm is mischmetal; M is at least one element selected from the group consisting of Li, Na, K, Rb, Cs, P and S; and where the atomic ratios, a, b, c, x, y, and z are defined by: $0.10 \leq a \leq 0.85$, $0.01 \leq b \leq 0.65$, $0.02 \leq c \leq 0.75$, $0 \leq y \leq 0.30$, $0 \leq x \leq 0.30$, $0 \leq z \leq 0.03$, and $a+b+c+y+x+z=1.00$ (2) pasting the slurry onto and/or into a substrate to form a wet pasted electrode;

(3) drying the wet pasted electrode; and (4) sintering the dried pasted electrode.

6. A method of claim 5 further comprising steps of pressing and re-sintering the sintered electrode.

7. A method for making a high capacity rechargeable hydrogen/hydride electrode comprising the steps of:

(1) preparing a slurry of hydrogen storage material; wherein said material comprises a hydrogen storage material having composition formula: $Ti_aZr_bNi_cNb_yR_zM_x$, and its hydride thereof; where R is at least one element selected from the group consisting of C, Mg, Al, B, Si, V, Cr, Mn, Fe, Co, Cu, Zn, Hf, Bi, Sn, Ta, W, Pd, Ag, Mo, Sb, La, Ce, and Mm, where Mm is mischmetal; M is at least one element selected from the group consisting of Ca, Li, Na, K, Rb, Cs, S and P; and the atomic ratios, a, b, c, x, y, and z are defined by: $0.02 \leq a \leq 0.70$, $0.02 \leq b \leq 0.70$, $0.05 \leq c \leq 0.80$, $0.02 \leq y \leq 0.50$, $0.005 \leq z \leq 0.30$, $0 \leq x \leq 0.30$, and $a+b+c+x+y+z=1.00$ (2) pasting the slurry onto and/or into a substrate to form a wet pasted electrode;

(3) drying the wet pasted electrode; and (4) sintering the dried pasted electrode.

* * * * *